United States Patent [19]

Pickenhahn et al.

[11] Patent Number: 4,989,922
[45] Date of Patent: Feb. 5, 1991

[54] METHOD OF ANTI-LOCK BRAKE CONTROL FOR MOTORCYCLE VEHICLE

[75] Inventors: Josef Pickenhahn, Plaidt; Stephen P. J. Barr, Nauort; Christoph Beuerle, Koblenz; Klaus Glasmacher, Boppard; Alois Weidele, Essingen; Martin Fischer, Erzhausen, all of Fed. Rep. of Germany

[73] Assignee: Lucas Industries public limited company, Birmingham, England

[21] Appl. No.: 439,734

[22] Filed: Nov. 20, 1989

[30] Foreign Application Priority Data

Nov. 23, 1988 [DE] Fed. Rep. of Germany ....... 3839520
Oct. 5, 1989 [DE] Fed. Rep. of Germany ....... 3933294

[51] Int. Cl.$^5$ .......................... B60T 8/32; B60T 8/18; B62L 3/08
[52] U.S. Cl. ...................... 303/100; 180/219; 188/181 A; 188/181 R; 188/195; 188/344; 303/22.5; 303/113; 303/DIG. 4; 303/24.1
[58] Field of Search ................. 303/91–119, 303/DIG. 3, DIG. 4, 24.1, 22.5, 9.62; 188/181 T, 181 A, 181 C, 344, 181 R, 195, 24.11; 180/219

[56] References Cited

U.S. PATENT DOCUMENTS

| | | | |
|---|---|---|---|
| 4,124,088 | 11/1978 | Kuriyama et al. | 303/106 X |
| 4,456,310 | 6/1984 | Hayashi et al. | 188/344 X |
| 4,477,123 | 10/1984 | Schnürer | 303/24.1 |
| 4,480,309 | 10/1984 | Burckhardt et al. | 303/96 X |
| 4,626,038 | 12/1986 | Hayashi et al. | 303/113 X |
| 4,725,102 | 2/1988 | Ando et al. | 303/24.1 |
| 4,733,757 | 3/1988 | Hayashi et al. | 303/24.1 X |
| 4,766,982 | 8/1988 | Hayashi et al. | 188/181 A |
| 4,834,221 | 5/1989 | Yoshihori et al. | 188/344 X |
| 4,850,656 | 7/1989 | Ise et al. | 303/24.1 X |
| 4,917,444 | 4/1990 | Ishido et al. | 303/9.62 X |

FOREIGN PATENT DOCUMENTS

| | | | |
|---|---|---|---|
| 3629815 | 3/1988 | Fed. Rep. of Germany | 180/219 |
| 0261549 | 11/1987 | Japan | 180/219 |
| 0297386 | 11/1989 | Japan | 180/219 |

*Primary Examiner*—Douglas C. Butler
*Attorney, Agent, or Firm*—Scrivener and Clarke

[57] ABSTRACT

In an anti-lock brake system (ABS) for a motorcycle the driving stabilty is improved by measuring the position of lateral inclination of the motorcycle and adjusting at least one threshold value for the anti-skid control in response to the measurement. In another embodiment the transverse acceleration of the motor cycle is measured and an ABS threshold value adjusted accordingly.

8 Claims, 7 Drawing Sheets

METHOD OF ANTI-LOCK BRAKE CONTROL FOR MOTORCYCLE VEHICLE

FIELD OF THE INVENTION

The instant invention relates to an anti-lock brake system (ABS) for single-track motor vehicles to measure the rotational behavior of the wheels of the vehicle and then to lower, maintain, or raise at a smaller gradient than before the pressure of the brake at a wheel being retarded if the rotational retardation and/or the slip of said wheel surpass(es) given threshold values.

Single-track motor vehicles in the sense of the instant invention above all are motorcycles, in other words motor vehicles having two wheels.

BACKGROUND OF THE INVENTION

Anti-lock brake systems for single-track motor vehicles are known and being used in practice (Journal VDI-Nachrichten, Apr. 29, 1988, page 25).

As compared to ABS systems used in four wheel vehicles, however, anti-lock braking of single-track motor vehicles causes considerable problems. When motorcycles are driven through curves, the superimposed longitudinal and transverse accelerations cause the greatest difficulties on braking. A wheel which transmits maximum lateral guiding forces between the roadway and the vehicle cannot at the same time transmit longitudinal forces, in other words brake performance. As a consequence, when driving through a curve the wheel will be retarded by too much brake pressure and therefore start to skid so that a fall practically is inevitable.

It is suggested in German Patent application No. P 38 38 520.7 published Nov. 14, 1988 that the transverse acceleration should be measured as the decisive parameter for adjustment of the threshold value for ABS control.

However, there are driving situations in which, although there is no transverse acceleration, braking still causes great problems. Such a situation exists, for example, when driving straight forward on a downward slope. In such a situation, as in travelling through a curve, the point of contact of the tire of the motorcycle leaves the center line (vertical plane of symmetry) of the motorcycle. If the driver applies the brakes in such a situation, either in a curve or on an inclined road surface on forward driving, the brake moment will cause a torque at the handle bar or guide of the vehicle because of the asymmetric position of the point of contact of the tire. This torque is directed such that it will attempt to erect the motorcycle out of its inclined position into the vertical position.

As the driver can hardly get control over this steering moment, the resulting situation is highly dangerous.

SUMMARY OF THE INVENTION

It is, therefore, an object of the invention to provide an anti-lock brake system (ABS) for single-track motor vehicles (motorcycles) which safety is improved on braking.

This object is met, in accordance with the invention, in that the inclined position of the motorcYcle is measured and at least one threshold value is adjusted in response to the same.

It is preferred to measure the position of inclination by at least one distance meter mounted on the motor vehicle.

In accordance with another embodiment of the invention the position of inclination is determined by measuring and comparing the wheel loads at least one bearing of the two wheel vehicle, preferably the bearing of the front wheel both at the left and right sides of the center line (vertical line of symmetry of the vehicle).

The invention thus is based on the finding that the travelling safety of a motorcycle can be improved considerably by modifying an otherwise conventional ABS braking system such that the effective threshold values (which are decisive to initiate the reduction of brake pressure on braking) are varied in response to the position of lateral inclination of the motorcycle. If the motorcycle is in an inclined position it is prevented by the invention that the driver, on applying the brakes, produces such a great brake moment at the wheels that the steering moment mentioned will cause his fall. At increasing inclination of the motorcycle the ABS threshold values are set more sensitively, in other words, the brake pressures are reduced gradually earlier as the position of inclination becomes more oblique.

Well proven means are available nowadays to measure the geometric position of inclination of a motorcycle, in particular distance measuring instruments from cameras and ultrasonic instruments from the measuring technique. In accordance with a preferred embodiment of the invention, therefore, it is provided to mount at least one distance meter on the motorcycle to measure the distance from ground. If the motorcycle gets into an oblique position, this distance changes and that information is passed on to the processor of the ABS brake system so that the latter will modify the braking operation, as described above.

In view of the fact that the highly undesired steering moment occurring at the wheel upon braking in inclined position is dependent also on the velocity, the speed of the motorcycle may be allowed for at the same time when adjusting the threshold values.

Another preferred solution according to the invention of the above mentioned problems provides for measuring the occurrence of a transverse acceleration during travel and for changing a threshold value which is decisive for the ABS control in response to the transverse acceleration. The higher the transverse acceleration, the more sensitive the setting of the threshold value, in other words the anti-lock control responds sooner than when there is little or no transverse acceleration.

With this solution provided by the invention the threshold value is reduced inversely proportinal to the amount of the transverse acceleration measured. The proportionality can follow different functions, e.g. the threshold value which is decisive for the ABS control can be reduced linearly by the quantity of the transverse acceleration measured. It is also possible to lower the threshold value inversely proportional to the square of the transverse acceleration measured or in accordance with an exponential function.

The same is true of the variation described above of the threshold value in response to the position of inclination.

In the case of four wheel vehicles the measuring of the transverse acceleration causes much less problems than with one-track motor vehicles. It is already known with ABS brake systems for-four wheel vehicles to take into consideration the transverse acceleration of the vehicle in the anti-lock control (DE-OS 34 21 732). The measurement of the transverse acceleration with a four wheel vehicle, for example, can be accomplished by simple mechanical means, such as a pendulum or the like because, when driving through a curve, the vehicle does not adopt an inclined position which would disturb the measurement. A motorcycle on the other hand, when driving through a curve adopts a position of inclination which depends on the centrifugal force so that there are no simple mechanical means to determine the transverse acceleration.

In a preferred modification of the invention, therefore, the transverse acceleration of a motorcycle is determined for an anti-lock control operation by measuring the wheel loads. This means that the invention makes use of the finding that not only the gravity of the driver and the motorcycle generate a wheel load when travelling through a curve but that also the centrifugal force raises the wheel component which depends on the angle of inclination of the motorcycle. Then the transverse acceleration, in first approximation, can be measured such that the wheel loads of the motorcycle are observed in response to time. When travelling straight forward it is only the weight of the motorcycle and of the driver and of any luggage which acts as wheel loads on the front and rear axes of the two wheels, if one leaves aside buoyancies which occur at extremely high speeds. In a curve, the wheel loads are increased considerably as a clear function of the transverse acceleration and, therefore, are a measure of the transverse acceleration. For this reason the behavior in time of the wheel load is monitored and used to derive an indication of the transverse acceleration, as described above.

In second approximation the measurement of the transverse acceleration can be improved by excluding possible sources of error which still exist with simple measurement of the wheel loads. For instance, it is conceivable that even when driving straight forward on an uneven road increased wheel loads occur for relatively short periods because of vertical accelerations of the motorcycle. It is obvious that on such straight forward driving the anti-lock control must take place as with normal forward driving, in other words no adaptation should be made to the particular circumstances which prevail when driving through a curve.

The differences mentioned in the wheel load on forward driving on an uneven roadway or when passing through a dent typically have a different course in time than wheel load increases occurring when driving through a curve. For instance, wheel load variations upon forward driving on an uneven roadway, as a rule, are relatively short and include steep gradients where the load rises. Furthermore, the courses in time of the wheel load variations differ at the front and rear wheels. The programmable ABS control means available at present permit to filter out such erroneous signals because of their time behavior when the transverse acceleration is determined by way of measuring the wheel load. For example, the wheel load in travelling through a curve will rise by a flatter gradient than when driving forward on an uneven roadway (e.g. through a pot hole). Therefore, a value may be set in the computer of the ABS-control system for the gradient of the rise of the wheel loads, and all changes in wheel load measured whose rise is steeper than the given gradient are eliminated as being unsuitable for determining the transverse acceleration because they are not due to travelling through a curve but instead to disturbances while driving forward.

Another improvement of the measurement of the transverse acceleration for ABS control in accordance with the invention takes advantage of the finding that when initiating the drive through a curve the driver briefly moves the handle bar in the opposite direction. A curve to the right, for example, must be initiated by briefly turning the handle bar to the left—regardless of the travelling speed. This brief turn to the left causes a displacement to the left of the connecting line of the points of contact of the wheel on the road surface whereby the gravity exerts a tilting moment on the system consisting of driver and motorcycle so that only then the driver can get into oblique position to the right. Immediately afterwards the handle bar is turned to the right so that a balance of force can be established. This means that each instance of travelling through a curve is preceded by a brief turn into a direction which is opposed to the curve. This knowledge is utilized by the invention in a particular embodiment for measuring the transverse acceleration with which the course in time of the position of the handle bar of the vehicle is measured and the presence of a transverse acceleration is determined not only in response to the wheel loads measured but also in response to the course in time of the position of the handle bar. In other words an increase of the wheel loads in this embodiment of an anti-lock brake system according to the invention is not interpreted as transverse acceleration causing corresponding lowering of the threshold value unless the occurrence of the increased wheel load is preceded by the handle bar being deflected for a shorter time period than a given value in a direction opposed to the direction which the handle bar adopts during the increasing of the wheel load.

The necessary means for measuring the wheel loads are available to those skilled in the art. Known, for instance, are force measuring bearings ("Kraftmeβregler; Funktionsweise der Kraftmessung und Montage" publication by Messrs. FAG; Kraftmeβsystem MGZ, publication no. WL 55130/2). Known force measuring bearings consist of a force measuring housing and a roller bearing inside the same. They fulfill two functions at the same time, namely to support the shafts and to measure the load. With a known force measuring bearing of this kind the wheel load can be measured by strain gauges and converted into electrical signals.

The wheel load can be measured particularly easily in another embodiment of the invention by determining the compression of the springs of the motorcycle. When the wheel load is increased i.e. when a transverse acceleration occurs in a curve, a mechanical spring is compressed and the extent of the compression is taken as a measure of the wheel load and thus of the transverse acceleration. If the motorcycle is provided with pressurized air supported suspension the wheel load can be determined particularly easily by measuring the gas pressure in the gas springs.

In a particularly preferred modification of the anti-lock brake system according to the invention the transverse acceleration is determined by separately measuring and comparing the wheel loads at the bearing of the front wheel of the motorcycle to the left and right of the center line of the vehicle. When the motorcycle is driven through a curve the point of contact between the tire and the surface of the road leaves the center line of the vehicle and a tilting moment is produced at the wheel which likewise is a clear function of the centrifugal force acting at the inclined vehicle and consequently of the transverse acceleration.

BRIEF DESCRIPTION OF THE DRAWINGS

The invention will be described further, by way of example, with reference to the accompanying drawings, in which.

DESCRIPTION OF PREFERRED EMBODIMENTS

Figure 1:
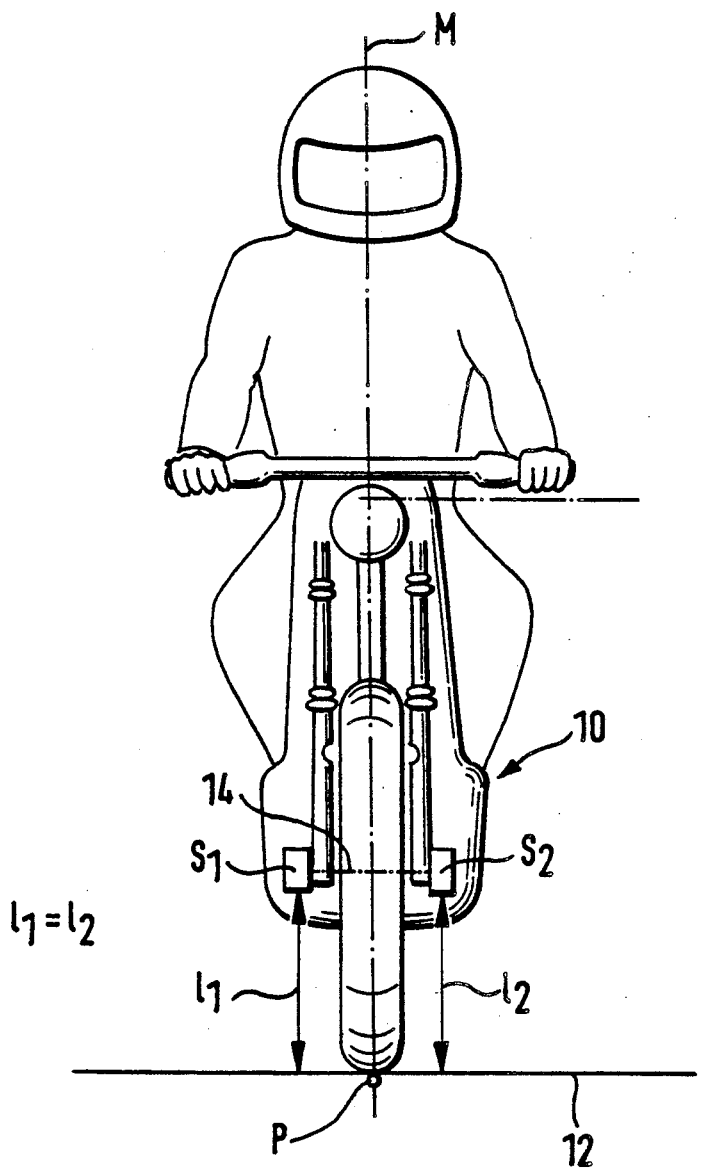
FIG. 1 shows a single-track motor vehicle in normal position.

A motorcycle 10 is driving on a roadway 12, the tire of the motorcycle being in contact with the roadway 12 at point P. As shown in FIG. 1, the motorcycle 10 is driving straight ahead without any inclination. The center line M is perpendicular to the roadway 12, and the axes 14 of the wheels extend parallel to the roadway 12.

Sensors $S_1$, $S_2$ are arranged in the area of the axes of the motorcycle to determine the distance $l_1$ and $l_2$ from the roadwaY 12. The sensors $S_1$, $S_2$ which measure the distance are of conventional type and, for instance, may operate optically or acoustically. Distance meters may be assumed to be known above all as range finders in cameras.

Figure 2:
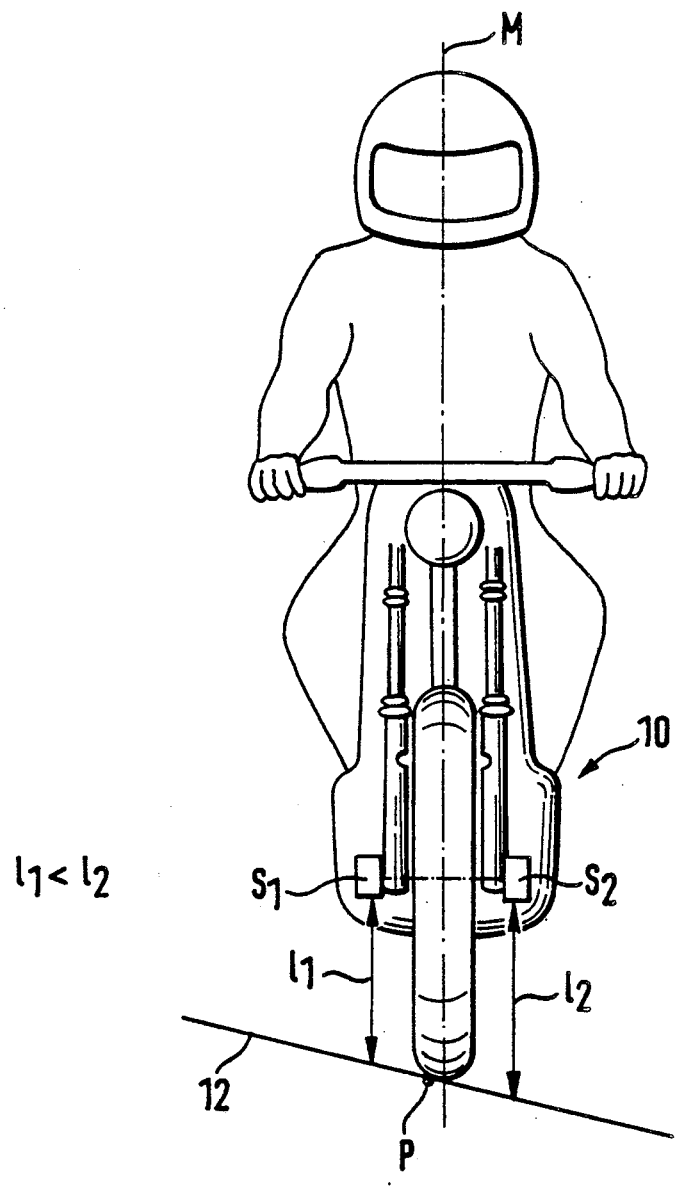
FIG. 2 shows a single-track motor vehicle in a position of inclination comprising a first embodiment of a means for measuring the inclined position.

In the position shown in FIG. 2, the motorcycle 10 is inclined. Such a driving situation as shown in FIG. 2 may occur when travelling straight forward transversely of sloping terrain. Under these conditions there will be no transverse acceleration. The position of inclination is determined by means of the sensors $S_1$, $S2$. A computer compares the measured distances $l_1$ and $l_2$ and calculates the position of inclination on the basis of these values.

The travelling situation shown in FIG. 2 likewise corresponds to driving through a curve as regards the relative position of the center line M and the roadway 12. As may be seen from FIGS. 2 and 3 the point of contact P between the tire and the roadway 12 travels away from the center line M. If the driver applies the brakes in this situation, a torque will be produced at the steering wheel because of the asymmetric position of the point of contact P, and this torque will tend to erect the motorcycle such that the center line M will be perpendicular to the roadway 12. This steering moment can hardly be controlled by the driver. Moreover, When driving through a curve, as a rule, the lateral guiding force of the tires is less than when travelling straight forward.

When determining a position of inclination by means of sensors $S_1$, $S_2$, therefore, the threshold value which is decisive for pressure reduction in the course of an ABS control operation is set more sensitively so that the brake pressure can be reduced more quickly if the brakes are applied in an inclined position and the torque at the steering wheel cannot develop to dangerous dimensions.

Figure 3:
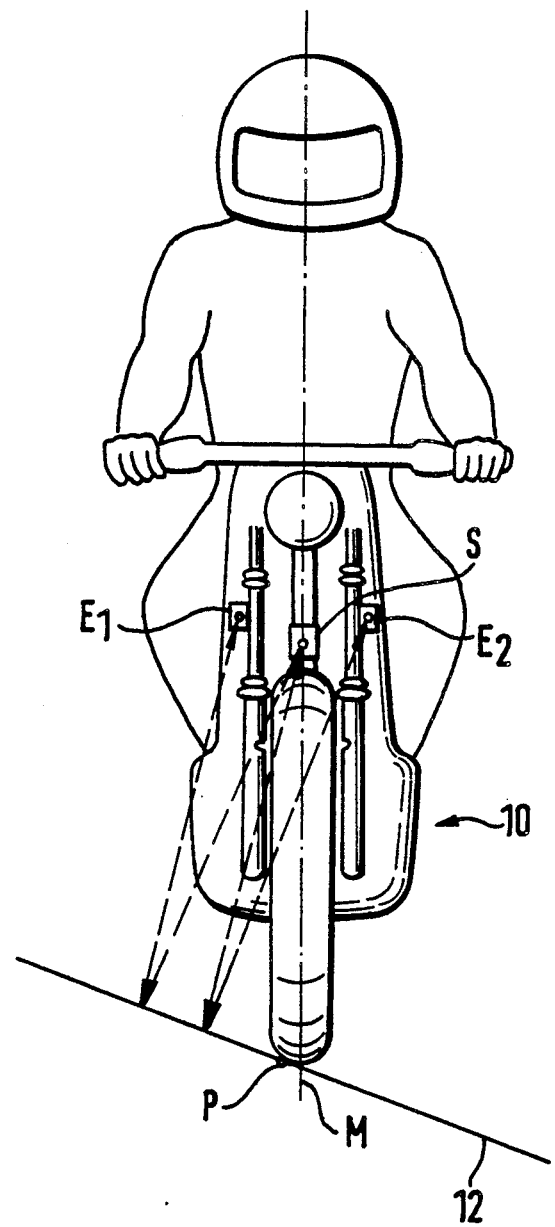
FIG. 3 shows a single-track motor vehicle in a position of inclination comprising a second embodiment of a device for measuring the position.

FIG. 3 shows a modification of the sensors. Here a transmitter S is arranged in the center, in other words in the central plane M of the motorcycle 10 and spherical waves. Receivers $E_1$, $E_2$ are disposed symmetrically to the left and right of the transmitter S. When the motorcycle is in an oblique position the travelling distances from the transmitter S to the two receivers $E_1$, $E_2$ are different and this fact can be utilized during the pulsating mode to determine the position of inclination.

It is likewise possible to modify the embodiments described above such that a single distance measuring instrument will determine the position of inclination because when the motorcycle is inclined, the distance of each point of the same from the ground becomes less, as against travelling straight forward. Such measurement, however, has the disadvantage that different tire conditions cannot be allowed for. The measurement of two distances to the left and right of the center line M of the motorcycle has the advantage that the comparison of the two values measured increases the reliability of the measurement.

FIG. 4 to 9 serve to illustrate another embodiment of the invention with which, rather than measuring directly the oblique position of the motorcycle, its transverse acceleration is measured. Measuring the transverse acceleration is believed to be less favorable than measuring the geometric inclined position (by means of a distance meter). However, also the measuring of transverse acceleration can provide useful results.

Figure 4:
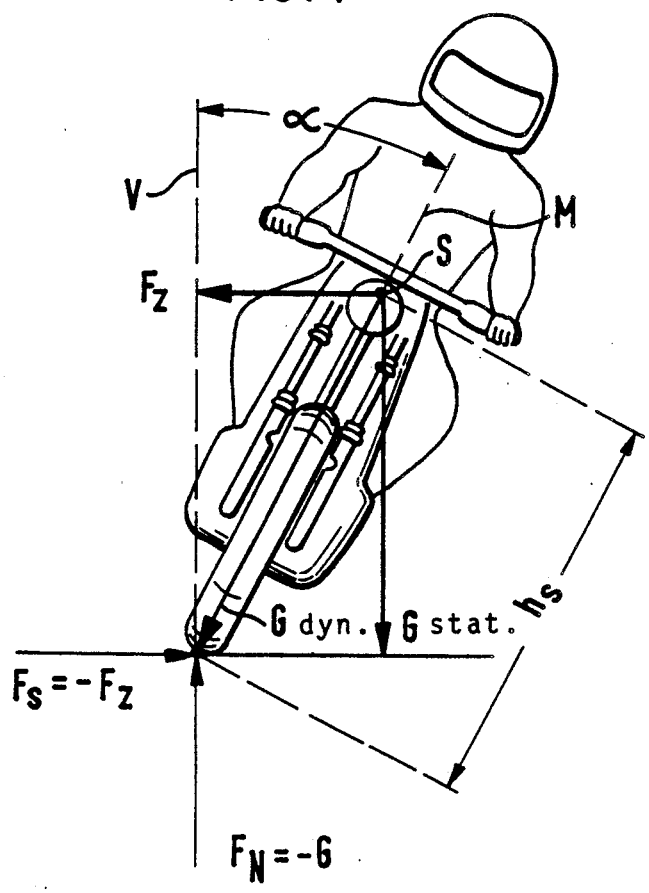
FIG. 4 illustrates the forces which occur when a motorcycle drives through a curve.

FIG. 4 shows a motorcycle travelling through a curve. The center of gravity of the system consisting of the motorcycle/driver (and luggage, if any) is marked S. It is located on the center line M of the motorcycle/driver sYstem.

The mass of the motorcycle and of the driver generates the force of gravity $G_{stat}$. In the curve the center line M and the vertical V include the angle of inclination $\alpha$. The centrifugal force $F_Z$ is at right angles to the vertical. The lateral guiding force $F_S$ corresponds to the centrifugal force $F_Z$, apart from the opposite sign. The force $F_N$ acting in vertical direction between the tire and the roadway corresponds to the weight $G_{stat}$ of motorcycle and driver.

The weight $G_{stat}$ of the motorcycle and driver which is effective when travelling straight forward or in a position of rest likewise produces the wheel loads at the axes of the front and rear wheel of the motorcycle during straight forward travel and at rest. The buoyancies which occur at high velocities may be left out of consideration for the time being.

In the curve the wheel load effective at the axes of the wheels increases in correspondence with the "dynamic" weight $G_{dyn}$, and the centrifugal force may be calculated according to FIG. 4 as follows:

$$F_z = \sqrt{G_{dyn}^2 - G_{stat}^2}$$

As explained above, the centrifugal force $F_Z$ corresponds to the lateral guiding force. The centrifugal force is related to the transverse acceleration by way of the known equation of force=mass×acceleration.

Therefore, if the sum of the wheel loads is measured at the front and rear wheels of the motorcycle during the startup at low velocities of, for example, less than 6 km/h and if these values are stored, then at higher velocities in a curve the increase of the wheel loads can be determined in accordance with the dYnamic weight $G_{dyn}$ and the centrifugal force and, together with it, the transverse acceleration can be found by applying the equation given above.

Figure 5:
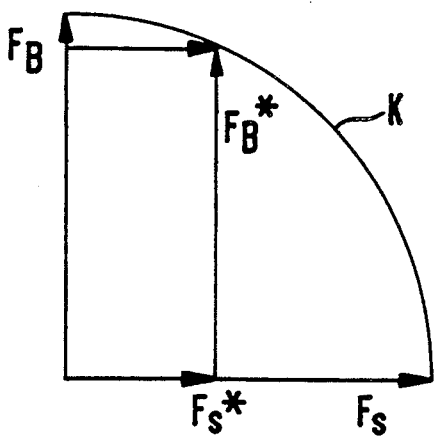
FIG. 5 illustrates the relationship between forces of lateral guidance and brake pressures which may occur upon driving through a curve.

As explained above, the maximum possible forces of lateral guidance $F_S$ occurring upon braking in a curve and the brake pressures $F_B$ depend on each other. This relationship is shown in the so called Kamm's friction circle (cf. the journal ATZ, 1969, page 182). The greater the lateral guiding force $F_S$, the smaller the corresponding maximum brake pressure which the tire can transmit to the surface of the road. This is illustrated in FIG. 5 which shows an "allowed" pair of lateral guiding forces $F_S^*$ and $F_B^*$. It may be taken from FIG. 5 that the brake pressure and the lateral guiding force combine to provide a resulting force which lies within the closed force circle K. If the resulting value surpasses this circle, the wheel will become locked. That means that it would practically lose all lateral guiding force and the motorcycle inevitably would slip away. The greater the lateral guiding force $F_S$ that is made use of, the smaller the remaining brake pressure $F_B$ becomes.

It is obvious that the maximum possible lateral guiding forces and brake pressures have not been described exhaustively by the above statements. What is decisive in addition is the coefficient of friction $\mu$ between the tire and the surface of the road. It is difficult and expensive, however, to measure the coefficient of friction $\mu$. If such measuring of the coefficient of friction is provided, the remaining brake pressure can be determined accurately. For present purposes, therefore, it is sufficient to assume a minimum coefficient of friction of e.g. $\mu = 0.6$. Lower coefficients of friction are negligible in practice because aquaplaning may be excluded with motorcycles. For if it should come to that, you are lost anyway.

Thus we are on the safe side if we take the lateral guiding force $F_S$ determined in accordance with the above equation on the basis of the changes of the wheel loads, which force corresponds to the contribution of the centrifugal force $F_Z$, and multiplY it bY an assumed minimum coefficient of friction of $\mu = 0.6$.

The Kamm's friction circle K shown in FIG. 5 then provides the maximum remaining brake pressure share $F_B^*$ at a given lateral guiding force as follows:

$$F_B^* = \sqrt{F_B^2 - F_S^{*2}}$$

wherein $F_B$ is the possible brake pressure during straight forward travel. Therefore, the brake pressure available when driving through a curve in accordance with the above equation is greatly reduced because of the lateral guiding force needed when driving through a curve. As explained above, the lateral guiding force corresponds to the transverse acceleration because the mass must be assumed to be constant. In order not to exceed the Kamm's friction circle K shown in FIG. 5, therefore, the threshold value in respect of the rotational retardation of the braked wheel or its slip must be set much more sensitively, in other words reduced, which threshold value is decisive for the pressure reduction upon anti-lock control in a curve (or for keeping the pressure constant or for changing to a pressure rise at a smaller gradient).

Figure 6A:
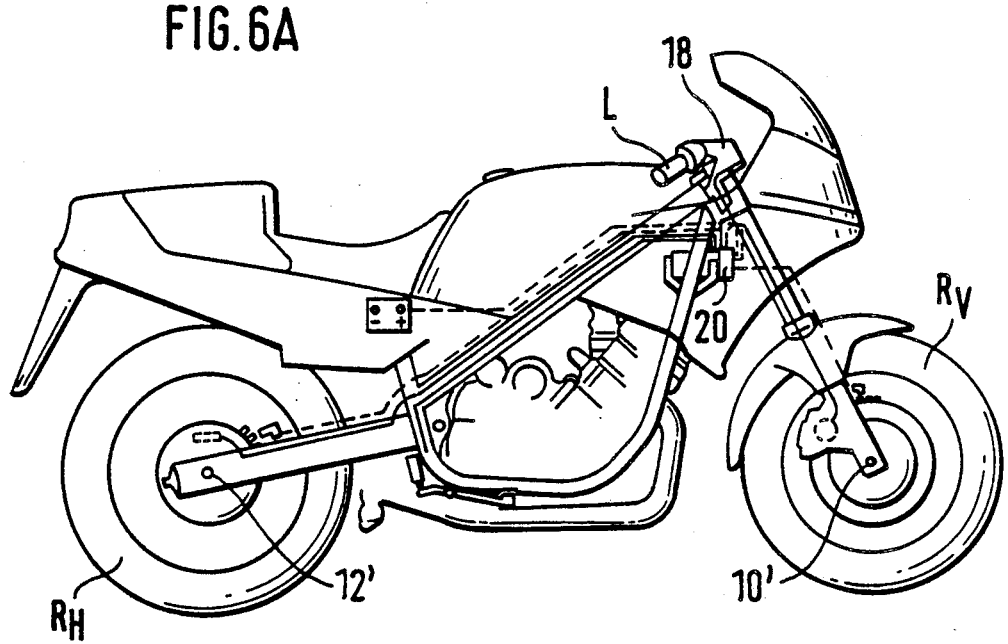
FIG. 6a is a lateral view of a motorcycle.

A first simple embodiment of the invention is to be seen with the motorcycle of FIG. 6 where measuring instruments 10' and 12' for the wheel load are disposed at the axes of the front and rear wheels $R_V$ and $R_H$. Suitable measuring instruments particularly are force measuring bearings with which a strain gauge determines the respective effective wheel load and converts it into an electrical signal. The lateral guiding force (transverse acceleration) is determined in the manner described above from the wheel loads measured and the threshold value which is decisive for anti-lock control is reduced inversely proportional to the magnitude of the transverse acceleration determined, i.e. it is adjusted more sensitively.

The optimum adjustment can be determined experimentally for a given motorcycle.

Figure 6B:
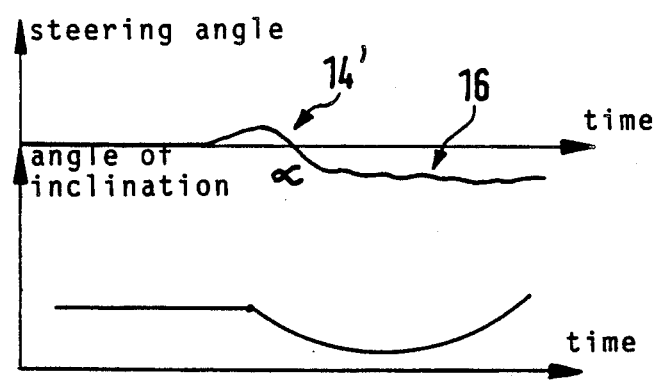
FIG. 6b shows the course in time of a steering angle when driving through a curve.

In further development of the embodiment of the invention described above, the course in time of the steering angle adjusted at the handle bar L of the motorcycle is observed in addition to the wheel loads measured. FIG. 6b shows a typical course of the steering angle and of the angle of inclination (FIG. 4) when driving through a curve, plotted above a common time axis. As explained above, prior to initiating the travel through the curve the driver (unconsciously) must briefly turn the handle bar L in a direction which is opposed to the intended direction of the curve. This turn of the steering angle in the opposite direction is designated 14' in FIG. 6b. The course in time of the steering angle is observed in order to eliminate by filtering any wheel load variations which are not caused by travelling through a curve. If the course corresponds approximately to the curve shown in FIG. 6b, it is assumed that wheel load changes occurring are due to the fact that the motorcycle travels through a curve. The computer of the anti-lock system therefore continuously observes the steering angle aimed at by the turn of the handle bar and memorizes the same for respective given time periods, such as the last ten seconds. If it is found during a turn of the steering angle corresponding to range 16 in FIG. 6b that the wheel loads at the front and rear wheels of the motorcycle have increased, and if it is found at the same time that during a given period of time previously a turn of the steering angle in the opposite direction took place in accordance with section 14 of the curve, which section was shorter than a given time period of, for example, one second, then it is assumed that the motorcycle is travelling through a curve and the transverse acceleration is determined in the manner described on the basis of the change of the wheel loads, and the threshold value for an ABS control operation is adjusted more sensitively so that, when braking, the brake pressure in the wheel brake cylinder will be lowered earlier as compared to straight forward travelling. In this manner locking of the wheel is prevented.

Once such an anti-lock brake control has been initiated, the threshold value which has been reduced in the manner just described first is increased again gradually because in the meantime braking effect has been obtained and consequently the transverse acceleration has been reduced. The braking performance to be achieved is improved by this increase of the threshold value.

At very high motorcycle speeds buoyancy begins to act which reduces the interrelation of the forces acting between the tire and the road surface in the sense that the coefficient of friction $\mu$ is deteriorated. In such instances the anti-lock control must be adjusted even more sensitively. Therefore another modification of the embodiment described above provides for the threshold value to be reduced still further at very high speeds.

It should be noted that the changes of the threshold value described for all the above embodiments relate to those threshold values which are used with known motorcycle ABS control systems for straight forward travelling.

Empirical investigations have shown that under extreme inclinations of a motorcycle in a curve when practically the entire guiding force of the tire is used up for the lateral guidance the threshold value must be reduced quite considerably as compared to forward travelling. During forward travelling, for example, slip values of 30 to 35% permit optimum braking (the brake pressure coefficient is a known function of the brake slip, cf. e.g. the journal cited above ATZ, page 182). If there is great transverse acceleration, however, the maximum brake slip permitted is no more than e.g. 1%. In this case consequently the threshold value in respect of the brake slip must be adjusted, for example to 1/30 of the threshold value for forward travelling.

Only minor supplements are needed to turn a conventional motorcycle ABS system into an ABS control system according to the invention. The measuring instruments 10', 12' mentioned are required for the wheel loads and a sensor 18 is needed for the steering angle (FIG. 6). The measuring values of the measuring instruments 10', 12' and of the steering angle sensor 18 are taken constantly at a given cycle of, for example, 2 ms and are entered into an ABS computer 20. The sum of the Wheel loads provides the dynamic weight $G_{dyn}$ described above and the transverse acceleration is derived from the same. Based on the dynamic weight $G_{dyn}$ determined by the wheel load measuring instruments 10', 12' the computer thus determines the corresponding threshold value for the anti-lock control. The computer may be programmed in such a way that it takes into consideration the behavior in time of the steering angle described above with reference to FIG. 6b and/or the gradients of the rising dynamic weight as well and that it filters out conditions as not belonging to travelling through a curve with which conditions steering angle behavior according to FIG. 6b cannot be associated or with which conditions the wheel load rises according to a gradient which is steeper than a given value.

At very high transverse accelerations of, for example, more than 4 m/s$^2$, in addition, the gradient of the pressure rise in the brake cylinder is reduced. This may be accomplished in per se known manner by clocked (pulsating) injection of the brake pressure into the brake cylinder.

Figure 7A:
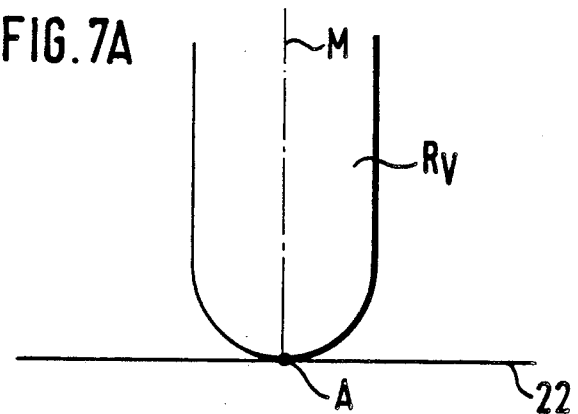
FIG. 7A, 7B and 7C illustrates different positions of a wheel with reference to a roadway.
Figure 7B:
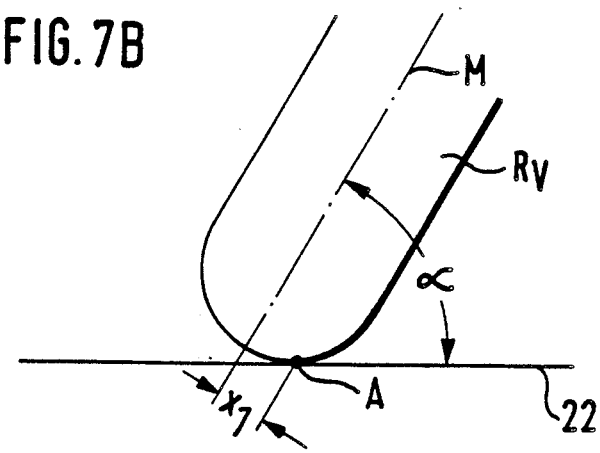
Figure 7C:
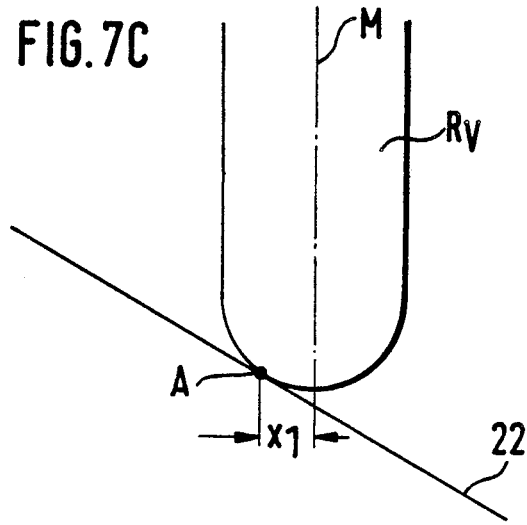
Figure 8:
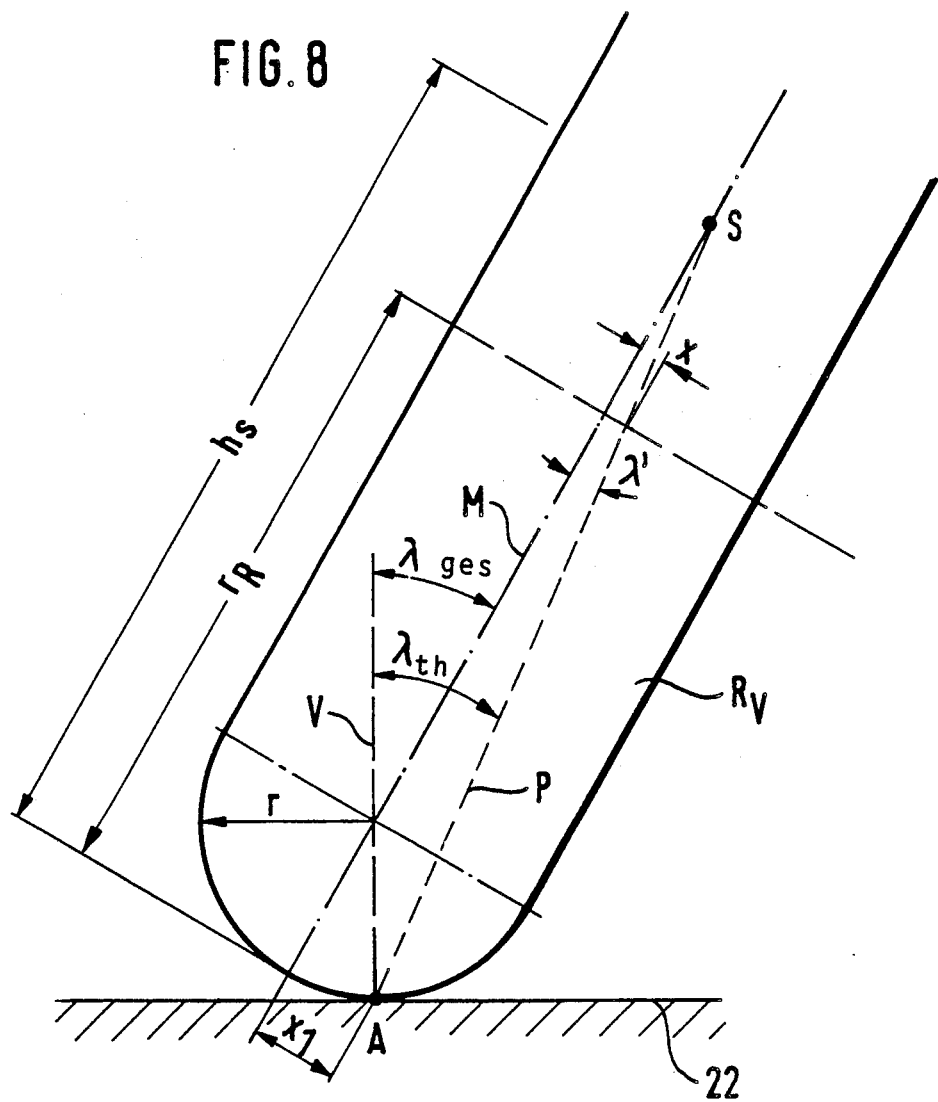
FIG. 8 shows the lines and angles which are decisive for calculating a tilting moment and which occur with the position of inclination illustrated in FIG. 6b.

FIGS. 7 and 8 show another embodiment of an anti-lock brake system for motorcycles according to the invention with which the transverse acceleration of the motorcycle is measured in a manner which differs from that of the embodiments already described. Yet the determination described below of the transverse acceleration can be combined with what has been described before, if that is desired.

FIG. 7 shows different positions of a wheel of a single-track motor vehicle according to FIG. 6 with respect to a roadway 22. When travelling in forward direction, as shown in FIG. 7a, the center line M (cf. FIG. 4) is vertical with respect to the roadway 22. In a curve, as shown in FIG. 7b, the center line M is positioned at an angle $\alpha$ with respect to the surface of the road. This means that the point of contact A leaves the center line M. Particularly with modern wide tires which are finding wide spread use in motorcycles, the point of contact A travels by a distance $x_1$ away from the center line M, and this distance leads to a considerable tilting moment about the wheel. The inclined position shown in FIG. 7b causes the wheel to adopt its own steering behavior. Together with the lever arm $x_1$ which is perpendicular to the steering axis the brake pressure generates a steering moment which tends to turn the front wheel toward the inside of the curve. This has the consequence that the motorcycle attempts to become erected and thus get in a direction toward the outside of the curve. The driver must counteract that by exerting steering force in the opposite direction. Inversely, the release of the brake in the curve causes the sudden elimination of the steering moment and the driver gets the feeling of "falling" with his motorcycle into the inside of the curve, a fact which again he must balance by steering in the opposite direction.

The independent steering behavior described does not disturb the observations to follow. It is assumed that the driver steers in the opposite sense, as usual, and therefore keeps his vehicle in the position shown in FIG. 7b when driving through a curve. FIG. 8 shows further details. The angle $\lambda_{ges}$ which is included between the vertical V and the center line M of the tire $R_v$ is smaller than the angle $\lambda_{th}$ which is included between the vertical V and the connecting line P between the center of gravity S and the point of contact A. As a consequence, different bearing forces occur at the left and right bearing points of the front wheel (and of the rear wheel accordingly). These permit a direct statement to be made about the position of inclination of the motorcycle. And it makes no difference whether the motorcycle is travelling through a curve, as shown in FIG. 7b, or the road surface is inclined with respect to the vertical V, as shown in FIG. 7c, or a combination of these conditions is given.

Figure 9:
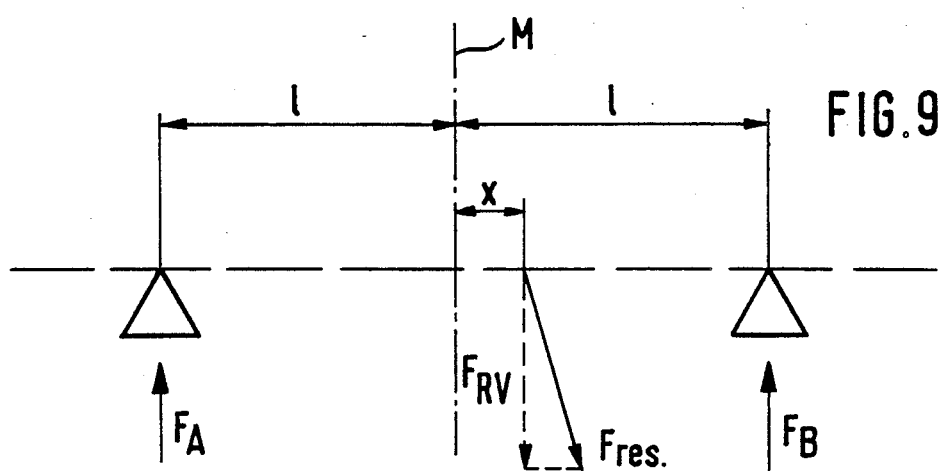
FIG. 9 shows details of how to calculate the tilting moment at a front wheel.

Simple geometric and mechanical considerations will show that the bearing forces according to FIG. 9 can be calculated as follows:

$$F_A = F_{RV} \times (1-X)/21$$

$$F_B = F_{RV} \times (1=X)/21$$

and $$X = \tan \lambda \times (hs - r_R),$$

wherein the designations have the following meanings:
hs = height of the center of gravity
$v_R$ = wheel radius
$x_1$ = distance of point of contact A from the center line M $\lambda_{ges}$ = angle of inclination of the vehicle $\lambda_{th}$ = angle between the vehicle center line M and the connecting line between the center of gravity S and the point of contact A $\lambda'$ = deviation of the center of gravity line from the center line X = distance of the wheel load point of attack at the front axis $F_A$ = bearing force left $F_B$ = bearing force right $F_{res}$ = wheel load $F_{RV}$ = vertical share of the wheel load l = distance of the center line from the axle bearing.

The bearing forces acting at the left and right of the center line can be measured ideally by separate force measuring bearings of the kind described above located at the left and right sides.

A more simple solution provides for measuring the forces at the wheel bearing to the left and right of the center line M by the bending of the axes just before the bearing points if a fixed axis is used.

Similarly to the simple measuring of the wheel load, it is likewise possible to measure the different compression of damping springs provided at the left and right of the center line M and, if desired, to determine the different pressures in gas springs and derive an asymmetric force distribution from the same, thus arriving at a transverse acceleration. The calibration of the system is easy, as explained above. A given motorcycle is driven at given speed through a curve of a given radius and, while doing that, the different compression values of the springs at the right and left sides are measured. In this manner specific transverse acceleration values can be associated with the compression values.

In a further modification of the embodiments of the invention described above the threshold value is raised over-proportionally after a given period of time which corresponds to the human time of reaction, e.g. one second. Hereby an experienced motorcycle driver, when braking in an extreme curve position, can discover by stronger pulsating at the hand lever of the brake and by changed brake behavior that a correction of the inclined position or a correction of the brake pressure is required. This change of the threshold value also gives the driver the opportunity under extreme circumstances to intentionally provoke a fall by enforced braking so that he can leave his vehicle.

The modifications of anti-lock control operations described above with reference to the measuring of the transverse acceleration may be applied just as well to the modification of the ABS control described with reference to FIGS. 1 to 3 based on direct measurement of the position of inclination by means of a distance meter.

What is claimed is:

1. A method of anti-lock brake control in a motorcycle vehicle or the like, said method comprising the steps of measuring the rotational speed of the wheels of the motorcycle vehicle and determining at least one of the parameters slip and retardation of a braked wheel, comparing the at least one measured parameter with a given threshold value, changing a pressure of the brake at the braked wheel in response to said comparison during anti-lock brake control, determining the position of lateral inclination of the motorcycle vehicle and changing said threshold value in response to said determined lateral inclination of said motorcycle vehicle.

2. The method as claimed in claim 1, wherein the position of lateral inclination is measured by at least one distance meter mounted on the motorcycle vehicle.

3. The method as claimed in claim 1, wherein the position of lateral inclination is determined by measuring and comparing the wheel loads at least one wheel bearing of the motorcycle vehicle to the left and right of the center line of the motorcycle vehicle.

4. The method as claimed in claim 3, wherein the wheel loads are determined in said motorcycle vehicle which is equipped with pressurized air supported springs in response to pressure measured by pressure sensors.

5. The method as claimed in claim 3, wherein load sensors arranged in the wheel bearings serve to measure the wheel loads.

6. The method as claimed in claim 1, wherein the threshold value is adjusted more sensitively as the lateral inclination of the motorcycle vehicle becomes greater.

7. The method as claimed in claim 1, wherein the lateral inclination of the motorcycle vehicle is determined by measuring the transverse acceleration of the motorcycle vehicle.

8. The method as claimed in claim 1, wherein the course in time of the position of the handle bar of the motorcycle vehicle is measured and the presence of an inclined position of the motorcycle vehicle is determined in response to the same.

* * * * *